(12) United States Patent
Gocke

(10) Patent No.: US 9,731,649 B2
(45) Date of Patent: Aug. 15, 2017

(54) LIGHTING DEVICE FOR A MOTOR VEHICLE

(71) Applicant: Bayerische Motoren Werke Aktiengesellschaft, Munich (DE)

(72) Inventor: Tim Gocke, Munich (DE)

(73) Assignee: Bayerische Motoren Weke Aktiengesellschaft, Munich (DE)

( * ) Notice: Subject to any disclaimer, the term of this patent is extended or adjusted under 35 U.S.C. 154(b) by 96 days.

(21) Appl. No.: 14/735,925

(22) Filed: Jun. 10, 2015

(65) Prior Publication Data

US 2015/0274071 A1    Oct. 1, 2015

Related U.S. Application Data

(63) Continuation of application No. PCT/EP2013/074675, filed on Nov. 26, 2013.

(30) Foreign Application Priority Data

Dec. 11, 2012    (DE) .................. 10 2012 222 684

(51) Int. Cl.
*F21V 8/00* (2006.01)
*B60Q 3/02* (2006.01)
(Continued)

(52) U.S. Cl.
CPC ............. *B60Q 3/0293* (2013.01); *B60Q 1/18* (2013.01); *B60Q 1/38* (2013.01); *B60Q 3/64* (2017.02);
(Continued)

(58) Field of Classification Search
CPC . B60Q 1/18; B60Q 1/38; B60Q 3/004; B60Q 3/002; B60Q 3/0293;
(Continued)

(56) References Cited

U.S. PATENT DOCUMENTS 5,400,225 A     3/1995   Currie
6,836,611 B2 *  12/2004  Popovic .............. G02B 6/0041
                                             362/551
(Continued)

FOREIGN PATENT DOCUMENTS

CN          1952705 A      4/2007
CN        102777843 A     11/2012
(Continued)

OTHER PUBLICATIONS

English Translation, DE 10 2010 003270, Sep. 29, 2011.*
(Continued)

*Primary Examiner* — Peggy Neils
(74) *Attorney, Agent, or Firm* — Crowell & Moring LLP

(57) ABSTRACT

The invention relates to a lighting device for a motor vehicle, comprising a light guide for the totally reflecting guidance of light from two light sources along a light propagation axis, wherein the light from one light source can be coupled in at an in-coupling face on one end face of the light guide and the light from the other light source can be coupled in at another in-coupling face on another end face of the light guide. The light guide also has an out-coupling face arranged along the light propagation axis for coupling the light out, which light exits from the light guide at an exit face arranged along the light propagation axis where the total reflection condition is removed. The lighting device according to the invention is characterized in that the light guide is designed in such a manner that the light intensity distribution of the light from at least one light source exiting at the exit face has a gradient in the propagation direction of the light from the light source concerned, and a control device for the light sources (is provided in such a manner that, when the lighting device is switched on, the light sources are activated at a predefined switch-on time interval and thereby the brightness of at least one light source is (Continued)

modified on the basis of a ramped or stepped progression until a predefined brightness value is achieved.

18 Claims, 3 Drawing Sheets

(51) Int. Cl.
  *B60Q 1/18* (2006.01)
  *B60Q 1/38* (2006.01)
  *F21S 8/10* (2006.01)
  *B60Q 3/64* (2017.01)
  *B60Q 3/80* (2017.01)

(52) U.S. Cl.
  CPC ............ *B60Q 3/80* (2017.02); *F21S 48/1241* (2013.01); *F21S 48/1747* (2013.01); *F21S 48/215* (2013.01); *F21S 48/225* (2013.01); *F21S 48/2237* (2013.01); *F21S 48/2268* (2013.01); *F21S 48/2281* (2013.01); *G02B 6/0068* (2013.01); *G02B 6/0073* (2013.01); *G02B 6/0078* (2013.01)

(58) Field of Classification Search
  CPC .. F21S 48/1241; F21S 48/1747; F21S 48/215; F21S 48/2237; F21S 48/225; F21S 48/2268; F21S 48/2281; G02B 6/0068; G02B 6/0073
  See application file for complete search history.

(56) References Cited

U.S. PATENT DOCUMENTS

| | | | |
|---|---|---|---|
| 7,708,441 B2 | 5/2010 | Luecke et al. | |
| 7,726,854 B2 | 6/2010 | Bourdin et al. | |
| 8,454,214 B2* | 6/2013 | Kazaoka | B60Q 1/2665 362/249.02 |
| 8,585,270 B2* | 11/2013 | Nakada | F21S 48/215 362/602 |
| 8,624,822 B2* | 1/2014 | Uehara | G09G 3/3413 345/102 |
| 2003/0156422 A1 | 8/2003 | Tatewaki et al. | |
| 2008/0225542 A1 | 9/2008 | Mertens et al. | |
| 2009/0046474 A1 | 2/2009 | Sato et al. | |
| 2010/0302799 A1 | 12/2010 | Rosberg et al. | |
| 2011/0249460 A1 | 10/2011 | Kushimoto | |
| 2012/0262425 A1 | 10/2012 | Andreola et al. | |

FOREIGN PATENT DOCUMENTS

| | | |
|---|---|---|
| DE | 103 08 703 A1 | 11/2004 |
| DE | 103 23 317 A1 | 12/2004 |
| DE | 103 44 174 A1 | 4/2005 |
| DE | 10 2008 015 561 A1 | 8/2009 |
| DE | 10 2010 003 270 A1 | 9/2011 |
| DE | 10 2010 028 949 A1 | 11/2011 |
| DE | 10 2010 048 659 A1 | 4/2012 |
| DE | 10 2011 013 211 A1 | 9/2012 |
| EP | 1 970 250 A1 | 9/2008 |
| EP | 2 596 992 A2 | 5/2013 |
| JP | 2005-276805 A | 10/2005 |
| WO | WO 2013/120124 A2 | 8/2013 |
| WO | WO 2014/002480 A1 | 1/2014 |

OTHER PUBLICATIONS

International Search Report dated Apr. 2, 2014 (Three (3) pages).
German Search Report dated Aug. 1, 2013, with Statement of Relevancy (Six (6) pages).
International Search Report dated May 20, 2014 (Three (3) pages).
German Search Report dated Oct. 29, 2013, with Statement of Relevancy (Six (6) pages).
Chinese Office Action issued in Chinese counterpart application No. 201380054003.7 dated Mar. 10, 2016, with English translation (Twenty (20) pages).

* cited by examiner

LIGHTING DEVICE FOR A MOTOR VEHICLE

CROSS REFERENCE TO RELATED APPLICATIONS

This application is a continuation of PCT International Application No. PCT/EP2013/074675, filed Nov. 26, 2013, which claims priority under 35 U.S.C. §119 from German Patent Application No. 10 2012 222 684.2, filed Dec. 11, 2012, the entire disclosures of which are herein expressly incorporated by reference.

BACKGROUND AND SUMMARY OF THE INVENTION

The invention relates to a lighting device for a motor vehicle.

Increasing use is being made nowadays in motor vehicles of lighting devices with a multiplicity of light sources which are often designed as LEDs. Various visual effects can be produced in this case by means of the use of a multiplicity of LEDs. For example, in a driving direction indicator comprising a multiplicity of juxtaposed LEDs, a wipe effect can be produced by the sequential activation of the LEDs when the driving direction indicator is switched on. It proves to be disadvantageous in lighting devices having a multiplicity of LEDs that the appearance of the lighting device is inhomogeneous because the LEDs emit in punctiform fashion, and, in addition, the LEDs must be driven individually via a multiplicity of channels.

It is therefore an object of the invention to provide a lighting device for a motor vehicle that can be used to generate light effects simply and efficiently.

The lighting device according to the invention, which is provided for a motor vehicle, is based on light guide technology. It comprises a light guide for totally reflecting guidance of light from two light sources along a light propagation axis, it being possible to couple in the light from one light source at a coupling face on one end face of the light guide, and to couple in the light from the other light source on another end face of the light guide. A decoupling face arranged along the light propagation axis is provided for decoupling light in the light guide. The decoupled light exits from the light guide in this case at an exit face arranged along the light propagation axis accompanied by cancelation of the total reflection condition.

The lighting device according to the invention is distinguished in that the light guide is designed in such a way that the light intensity distribution of the light, exiting at the exit face, of at least one light source of the two light sources and, in particular, of each of the two light sources, has a gradient in the propagation direction of the light from the respective light source. That is to say, the light intensity of the corresponding light source increases or decreases at the exit face in the propagation direction of the light.

Furthermore, a control device for the light sources is provided in such a way that the light source are activated in a prescribed switch-on time interval when the lighting device is switched on, and in this case the brightness of at least one light source, which in a preferred variant is a light source having the gradient in the light intensity distribution, is modified on the basis of a ramp and/or step profile until a prescribed brightness value is reached. The modification of the brightness in combination with the gradient in the light intensity distribution is designed in this case in such a way that the (photometric) centroid of the overall light distribution resulting at the exit face from the light intensity distributions of the two light sources travels away in the switch-on time interval along the light propagation axis to one of the coupling faces. The term of ramp and/or step profile is to be understood here and below in a wide sense. In particular, the rise and/or fall of the light distribution need not necessarily be linear in accordance with a ramp profile, but can also occur on the basis of another monotonically increasing or decreasing function. The length of the switch-on time interval can be chosen differently, and is preferably fixed in such a way that it corresponds to appropriate legal requirements, for example a maximum of 200 ms for a driving direction indicator.

With the use of light guide technology and only two light sources, the lighting device according to the invention can easily be employed to displace the photometric centroid of the light distribution, and thus to produce a light effect when the lighting device is switched on. As is described in more detail further below, the lighting device can be designed, for example, as a driving direction indicator such that the indicated driving direction is visually amplified by a wipe effect which is produced via the displacement of the photometric centroid.

In a particularly preferred embodiment, the brightness of the at least one light source increases on the basis of the ramp and/or step profile, as a result of which the effect of a traveling centroid of the overall light distribution is particularly well emphasized.

In a further refinement of the lighting device according to the invention, when the lighting device is switched on the brightness of a light source is modified on the basis of the ramp and/or step profile until the prescribed brightness value is reached, whereas the brightness of the other light source in the entire prescribed switch-on interval is set to a constant prescribed brightness value. In this variant, only one of the light source need be driven in a ramp or step fashion. Nevertheless, it is also possible for the brightness of the two light sources to be modified on the basis of a ramp and/or a step profile, as a result of which the effect of the traveling centroid of the overall light distribution can be amplified. In this case, the brightness of one light source increases in the switch-on time interval, whereas the brightness of the other light source decreases.

In a further variant of the lighting device according to the invention, the two light sources have different brightness values at the end of the switch-on time interval. In particular, the brightness value of one light source is 90% or less, and preferably 80% or less, than the brightness value of the other light source.

In a further refinement of the lighting device according to the invention, the light guide is designed as a continuous light guide section having two end faces at which the coupling faces are located. In this case, preferably, the light intensity distribution of the light, exiting at the exit face, of a respective light source decreases with increasing distance from the coupling face of the respective light source. As a result, a traveling movement of the centroid of the overall light distribution can be visualized particularly well.

In a further variant, the light guide has two separate light guide sections adjoining one another over adjacent end faces, the coupling faces being situated at end faces of the light guide sections arranged remotely from one another. Optionally, the lighting device can in this case comprise a plurality of the light guides according to the invention, it being possible, for example, for one or more of the light guides to have a continuous light guide section, and for one or more of the light guides to have two light guide sections adjoining one another.

In a preferred variant of the above embodiment of a light guide having two light guide sections, the light intensity distribution of the light, exiting at the exit face, of one light source decreases in the corresponding light guide section with increasing distance from the coupling face, whereas the light intensity distribution of the light, exiting at the exit face, of the other light source increases in the corresponding light guide section with increasing distance from the coupling face. It is preferred in this case that the control device for the light sources be designed in such a way that at the end of the switch-on time interval the overall light distribution, which results from the light intensity distributions of the two light sources on the exit face, has a continuous profile over the adjacent end faces. It is thereby suggested to a viewer that the light distribution is produced by a continuous light guide section.

In a further preferred refinement of the lighting device according to the invention, the light sources respectively comprise one or more semiconductor diodes and, in particular, one or more laser diodes.

The lighting device according to the invention can take over various functionalities in the vehicle and, in particular, be designed as a signal light and/or as a vehicle interior light and/or as a headlight. In a particularly preferred variant, the lighting device comprises a driving direction indicator. When installed in the motor vehicle, said driving direction indicator is preferably operable in such a way that the centroid of the overall light distribution, which results from the light intensity distributions of the two light sources on the exit face is displaced in the prescribed switch-on time interval to a coupling face which is situated closer to a lateral boundary of the motor vehicle adjacent to the driving direction indicator when the motor vehicle is viewed from the front or from the rear (depending on whether the driving direction indicator is arranged in the front region or rear region). A wipe effect is implemented in this way towards the turning direction of the driving direction indicator.

In one variant of the lighting device according to the invention, with a light guide comprising two separate light guide sections, the lighting device is provided for installation in a motor vehicle in such a way that the light guide sections are arranged in two different areas of the vehicle, one area of the vehicle being movable relative to the other area of the vehicle, and it being possible for the areas of the vehicle to be positioned relative to one another in such a way that the light guide sections adjoin one another over their adjacent end faces. It is possible in this way to achieve a variable arrangement of the lighting device in various vehicle parts movable relative to one another. In particular, it is possible, for example, for one light guide section to be provided in a movable tailgate, and for the other light guide section to be provided at the rear in a region fixedly adjoined thereto.

In addition to the above-described lighting device, the invention further relates to a motor vehicle which comprises one or more of the lighting devices according to the invention.

Exemplary embodiments of the invention are described below in detail with the aid of the attached figures, in which:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows diagrams which reproduce the light distribution in the light guide from FIG. 2 while the lighting device is switched on.

DETAILED DESCRIPTION OF THE DRAWINGS

Figure 1:
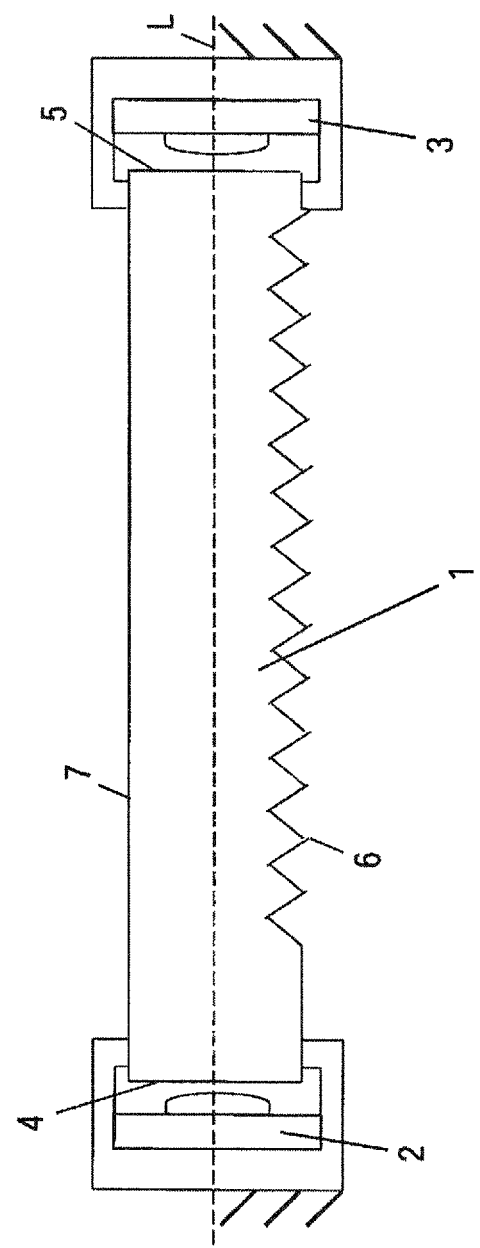
FIG. 1 shows a schematic of a first embodiment of a lighting device according to the invention.

FIG. 1 shows a first embodiment of a lighting device according to the invention for a motor vehicle such as, for example, an automobile or truck. The lighting device of FIG. 1 and also of FIG. 2 as described below in this case represents a driving direction indicator (also denoted as a flashing indicator). The flashing indicator extends from right to left from the vehicle interior to a lateral vehicle boundary. Optionally, the lighting device can also take over other functions in the vehicle, for example it can be part of a headlight or of another signal light than the driving direction indicator. It can likewise constitute an interior light in the vehicle.

The lighting device of FIG. 1 comprises a bar-shaped light guide 1 of cylindrical and, optionally, also of rectangular cross section, which is formed from PMMA (PMMA=polymethyl methacrylate) and extends along a light propagation axis L. Provided at the left-hand end of the light guide is an LED 2 which feeds light into the light guide via the coupling face 4 on the end face of the light guide. Provided similarly at the other end of the light guide is a further LED 3, which likewise feeds light into the light guide via the coupling face 5 at the opposite end face of the light guide. In the embodiment described here, the LEDs emit monochromatic light in the yellow region, as a result of which the driving direction indicator lights up in yellow when activated. The light of the two LEDs 2 and 3 is guided on the faces 6 and 7 in the light guide by means of total reflection, a portion of the light being continuously decoupled along its propagation direction via the lower decoupling face 6. The decoupling is performed via scattering or reflection at the face 6, which has a suitable decoupling structure. In this process, light is deflected at the decoupling structure in such a way that it strikes the opposite exit face 7 at an angle smaller than the total reflection angle, and therefore exits from the light guide. A prism arrangement or a roughened surface can, for example, be used in a way known per se as decoupling structure in the decoupling face 6.

In the embodiment of the lighting device according to the invention described here, the light sources or LEDs 2 and 3 are driven by means of a control device (not shown) in such a way that in the course of the switch-on operation of the driving direction indicator a wiping movement is produced in that the photometric centroid of the light distribution, which exits via the exit face, moves from the coupling surface 5 towards the coupling face 4. The drive is performed within a switch-on time interval of 200 ms, and this corresponds to the statutory requirements placed on duration for the switching on of a driving direction indicator. The decoupling face 6 of the light guide is designed in this case in such a way that the intensity both of the light irradiated into the coupling face 4 and of the light irradiated into the coupling face 5 decreases in the propagation direction along the light guide. That is to say, the light intensity of the light of the LED 2, which exits via the exit face 7, decreases from the coupling face 4 towards the coupling face 5. Similarly, the light intensity of the light which exits via the exit face 7, decreases from the coupling face 5 towards the coupling face 4. The design of corresponding decoupling structures for producing such a decreasing light distribution is known in this case per se from the prior art.

In the course of the switching on of the lighting device of FIG. 1, the LED 3 is switched directly to a prescribed power value, and thus to a prescribed brightness value, for example to 80% of the maximum power of the LED. In contrast hereto, the LED 2, which has the same power as the LED 3, is driven within the switch-on time interval via a ramp in such a way that the electric power of the LED increases continuously from 0% up to 100% at the end of the switch-on time interval after 200 ms. At the end of the switch-on time interval, the LED 2 therefore has a greater brightness than the LED 3. Owing to the ramp driving of the LED 2, the centroid of the light distribution moves from the coupling face 5 at the beginning of the switch-on operation to the coupling face 4, the maximum brightness of the driving direction indicator being situated in the region of the left-hand coupling face 4 at the end of the switch-on operation owing to the more strongly shining LED 2. Owing to the traveling of the centroid of the light distribution, a viewer experiences a wiping effect, as a result of which the turning direction is visually emphasized upon switching on of the flashing indicator. In order to amplify the wipe effect, it is also optionally possible to drive the LED 3 via a ramp, in which case the LED is, initially, set to 100% of its power and then dimmed back to 80% of its power up to the end of the switch-on time interval.

Figure 2:
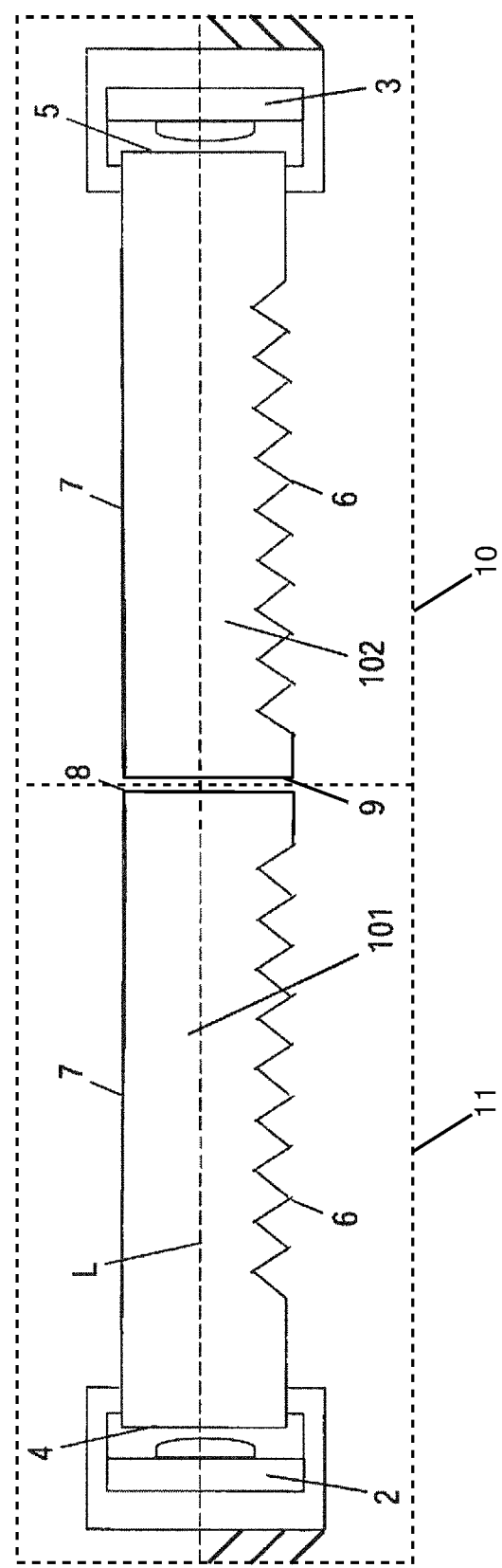
FIG. 2 shows a schematic of a second embodiment of a lighting device according to the invention.

FIG. 2 shows a second embodiment of a lighting device according to the invention which is, in turn, designed as a driving direction indicator. In contrast to the lighting device of FIG. 1, the light guide is no longer designed as a continuous light guide section, but comprises two separate light guide sections 101 and 102 which adjoin one another at adjacent end faces 8 and 9. Owing to the separation of the light guide, the light guided in the respective light guide sections does not pass from one light guide section into the other. The lighting device of FIG. 2 is provided in this case for the rear of a motor vehicle, the light guide section 102 with assigned LED 3 being arranged in the tailgate 10, and the light guide section 101 with assigned LED 2 being arranged in a nonmoving part 11 or remainder of the rear which extends up to the lateral boundary of the vehicle. FIG. 2 shows the lighting device with closed tailgate 10. In said state, the appearance of a continuous driving direction indicator which extends over the boundary between tailgate 10 and the remainder 11 of the rear is conveyed.

In analogy with FIG. 1, the individual light guide sections 101 and 102 comprise, in turn, a corresponding decoupling face 6 and a light exit face 7 such that light guided in the light guide sections is decoupled by means of the decoupling face and exits via the exit face 7 accompanied by cancelation of total reflection condition. The LEDs 2 and 3 are designed by analogy with FIG. 1 and couple their light into the light guide sections 101 and 102 via the coupling face 4 and the coupling face 5, respectively. The decoupling face 6 of the light guide section 101 is designed in such a way that the intensity of the light, exiting via the face 7, decreases from the coupling face 4 towards the end face 8. In contrast thereto, the decoupling face 6 of the light guide section 101 is designed in such a way that the intensity of the exiting light is greatest in the region of the end face 9, that is to say the light intensity decreases from the coupling face 5 towards the end face 9.

In order to produce a wipe effect, the electric power of the LED 2 is, in turn, increased within the switch-on time interval on the basis of a ramp profile up to a prescribed power value which is at 100% in the embodiment described here. In contrast, the LED 3 is switched directly to 100% of its power. It is to be borne in mind in this case that the decoupling faces 6 of the two light guide sections 101 and 102 are designed in such a way that whenever both LEDs are operated at 100% of their power the light intensities in the region of the end faces 8 and 9 in the two light guide sections are of equal magnitude such that when the flashing indicator is switched on a continuous profile of the light distribution over the end faces 8 and 9 is achieved.

Figure 3:
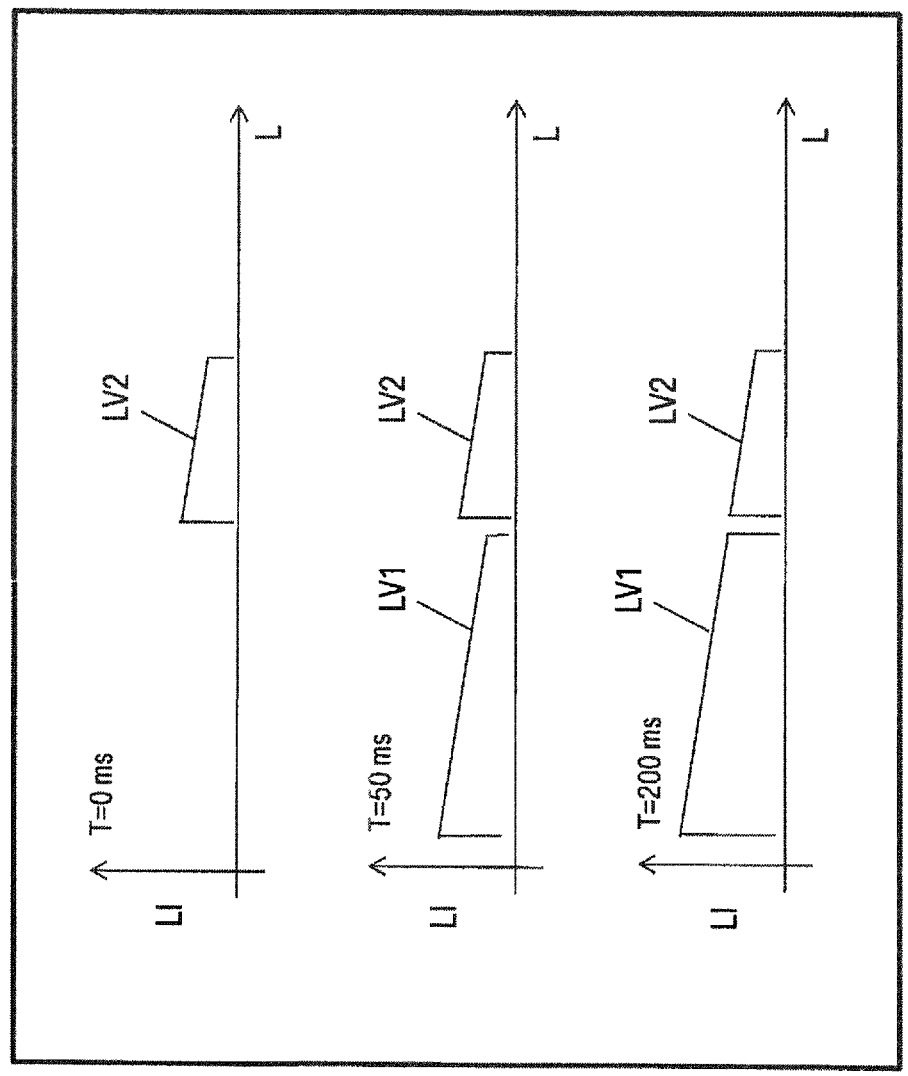

FIG. 3 again illustrates the driving of the two LEDs 2 and 3 while the flashing indicator of FIG. 2 is being switched on. For the switch-on instants T=0 ms (top diagram), T=50 ms (middle diagram) and T=200 ms (lower diagram), FIG. 3 shows the light intensity LI, resulting along the light propagation axis L, of the light exiting via the exit face 7. The abscissa of the diagrams extends in this case from the coupling face 4 to the coupling face 5. LV1 denotes the light distribution in the light guide section 101, and LV2 the light distribution in the light guide section 102. At the switch-on instant T=0 ms, the LED 3 is switched immediately to a constant electric power, and thus to a prescribed brightness value. Owing to the design of the decoupling face in the light guide section 102, the light intensity LV2 increases in the direction towards the end face 9. At the instant T=0 ms, the power of the LED 2 is still substantially at zero owing to the ramp drive, and so no light distribution has yet formed in the light guide section 101.

The light intensity in the light guide section 101 subsequently rises continuously with the elapsing time, as may be seen from the middle and the lower diagrams of FIG. 3. Owing to the structure of the decoupling face in the light guide section 101, the light intensity decreases in this case spatially from the coupling surface 4 to the end face 8. In contrast to the light distribution LV1, the light distribution LV2 in the light guide section 102 remains unchanged with time. At the end of the switch-on operation T=200 ms, the brightness of the LED 2 is set to a value such that despite the separation of the light guide in the two light guide sections there is a resulting continuously rising profile of the light distribution from the coupling face 5 towards the coupling face 4, thus producing for the observer the impression that the light guide forms a coherent light guide section. As may be seen from FIG. 3, the rise of the light intensity in the light guide section 101 produces a displacement of the photometric centroid of the overall light distribution towards the coupling face 4 such that a wiping movement is produced toward the turning direction of the flashing indicator. The driving direction indication of the flashing indicator is visually emphasized again in this way.

The embodiments of the invention which are described above have a range of advantages. In particular, a wipe effect is implemented in a lighting device in a simple way on the basis of light guide technology. As a result, it is possible to produce the appearance of a wiping driving direction indicator or flashing indicator. The wipe effect can be achieved in this case by the use of only two light sources or LEDs with the aid of an appropriate drive.

| List of references | |
|---|---|
| 1 | Light guide |
| 101, 102 | Light guide sections |
| 2, 3 | LEDs |

-continued

| | List of references |
|---|---|
| 4, 5 | Coupling faces |
| 6 | Decoupling face |
| 7 | Exit face |
| L | Light propagation axis |
| LI | Lighting intensity |
| LV1, LV2 | Light intensity distributions |
| T | Time |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lighting device for a motor vehicle, comprising:
a light guide for totally reflecting guidance of light from two light sources along a light propagation axis, wherein light is coupled in from one of the two light sources at a coupling face on one end face of the light guide, and light is coupled in from the other of the two light sources at another coupling face on another end face of the light guide, wherein the light guide further comprises a decoupling face arranged along the light propagation axis for decoupling light which exits from the light guide at an exit face arranged along the light propagation axis accompanied by cancelation of the total reflection condition, wherein the light guide is configured such that the light intensity distribution of light, exiting at the exit face, of at least one of the two light sources has a gradient in the propagation direction of the light from the at least one of the two light sources; and
a control device configured to activate the two light sources in a prescribed switch-on time interval when the lighting device is switched on, and wherein the brightness of at least one of the two light sources is modified on the basis of a ramp and/or step profile until a prescribed brightness value is reached, such that a centroid of the overall light distribution resulting at the exit face from the light intensity distributions of the two light sources travels in the prescribed switch-on time interval along the light propagation axis to one of said coupling faces.

2. The lighting device as claimed in claim 1, wherein the brightness of the at least one of the two light sources increases on the basis of the ramp and/or step profile.

3. The lighting device as claimed in claim 1, wherein, when the lighting device is switched on the brightness of one of the two light sources is modified on the basis of the ramp and/or step profile until the prescribed brightness value is reached, and the brightness of the other of the two light sources in the entire prescribed switch-on time interval is set to a constant prescribed brightness value.

4. The lighting device as claimed in claim 1, wherein the brightness of the two light sources is modified on the basis of a ramp and/or a step profile.

5. The lighting device as claimed in claim 4, wherein the brightness of the brightness of one of the two light sources increasing and the brightness of the other of the two light sources decreasing.

6. The lighting device as claimed in claim 1, wherein the two light sources have different brightness values at the end of the switch-on time interval.

7. The lighting device as claimed in claim 6, wherein at the end of the switch-on time interval the brightness value of one of the two light sources is 90% or less than the brightness value of the other light source.

8. The lighting device as claimed in claim 1, wherein the light guide is configured as a continuous light guide section having two end faces at which the coupling faces are located.

9. The lighting device as claimed in claim 8, wherein the light intensity distribution of the light, exiting at the exit face, of a respective one of the two light sources decreases with increasing distance from the coupling face of the respective light source.

10. The lighting device as claimed in claim 1, wherein the light guide has two separate light guide sections adjoining one another over adjacent end faces, the coupling faces being situated at end faces of the light guide sections arranged remotely from one another.

11. The lighting device as claimed in claim 10, wherein the light intensity distribution of the light, exiting at the exit face, of one of the two light sources decreases in the corresponding light guide section with increasing distance from the coupling face of such light source, and the light intensity distribution of the light, exiting at the exit face, of the other one of the two light sources increases in the corresponding light guide section with increasing distance from the coupling face of such other light source.

12. The lighting device as claimed in claim 11, wherein the control device for the two light sources is configured such that, at the end of the switch-on time interval, the overall light distribution has a continuous profile over the adjacent end faces.

13. The lighting device as claimed in claim 1, wherein the two light sources each respectively comprise one or more semiconductor diodes.

14. The lighting device as claimed in claim 1, wherein the lighting device comprises at least one of a signal light, a vehicle interior light and a headlight.

15. The lighting device as claimed in claim 1, wherein the lighting device comprises a driving direction indicator.

16. The lighting device as claimed in claim 15, wherein, when installed in the motor vehicle, the driving direction indicator is operable such that the centroid of the overall light distribution in the prescribed switch-on time interval is displaced to a coupling face which is situated closer to a lateral boundary of the motor vehicle adjacent to the driving direction indicator when the motor vehicle is viewed from the front or from the rear.

17. The lighting device as claimed in claim 10, wherein the lighting device is provided for installation in a motor vehicle such that the light guide sections are arranged in two different areas of the motor vehicle, wherein one of the two different areas is movable relative to the other of the two different areas of the motor vehicle, and wherein the two different areas are positioned relative to one another such that the light guide sections adjoin one another over their adjacent end faces.

18. A motor vehicle having at least one lighting device, wherein each of the at least one lighting device comprises:
a light guide for totally reflecting guidance of light from two light sources along a light propagation axis, wherein light is coupled in from one of the two light sources at a coupling face on one end face of the light guide, and light is coupled in from the other of the two light sources at another coupling face on another end face of the light guide, wherein the light guide further comprises a decoupling face arranged along the light propagation axis for decoupling light which exits from the light guide at an exit face arranged along the light propagation axis accompanied by cancelation of the total reflection condition, wherein the light guide is configured such that the light intensity distribution of light, exiting at the exit face, of at least one of the two light sources has a gradient in the propagation direction of the light from the at least one of the two light sources; and a control device configured to activate the two light sources in a prescribed switch-on time interval when the lighting device is switched on, and wherein the brightness of at least one of the two light sources is modified on the basis of a ramp and/or step profile until a prescribed brightness value is reached, such that a centroid of the overall light distribution resulting at the exit face from the light intensity distributions of the two light sources travels in the prescribed switch-on time interval along the light propagation axis to one of said coupling faces.

\* \* \* \* \*